Patented Apr. 22, 1947

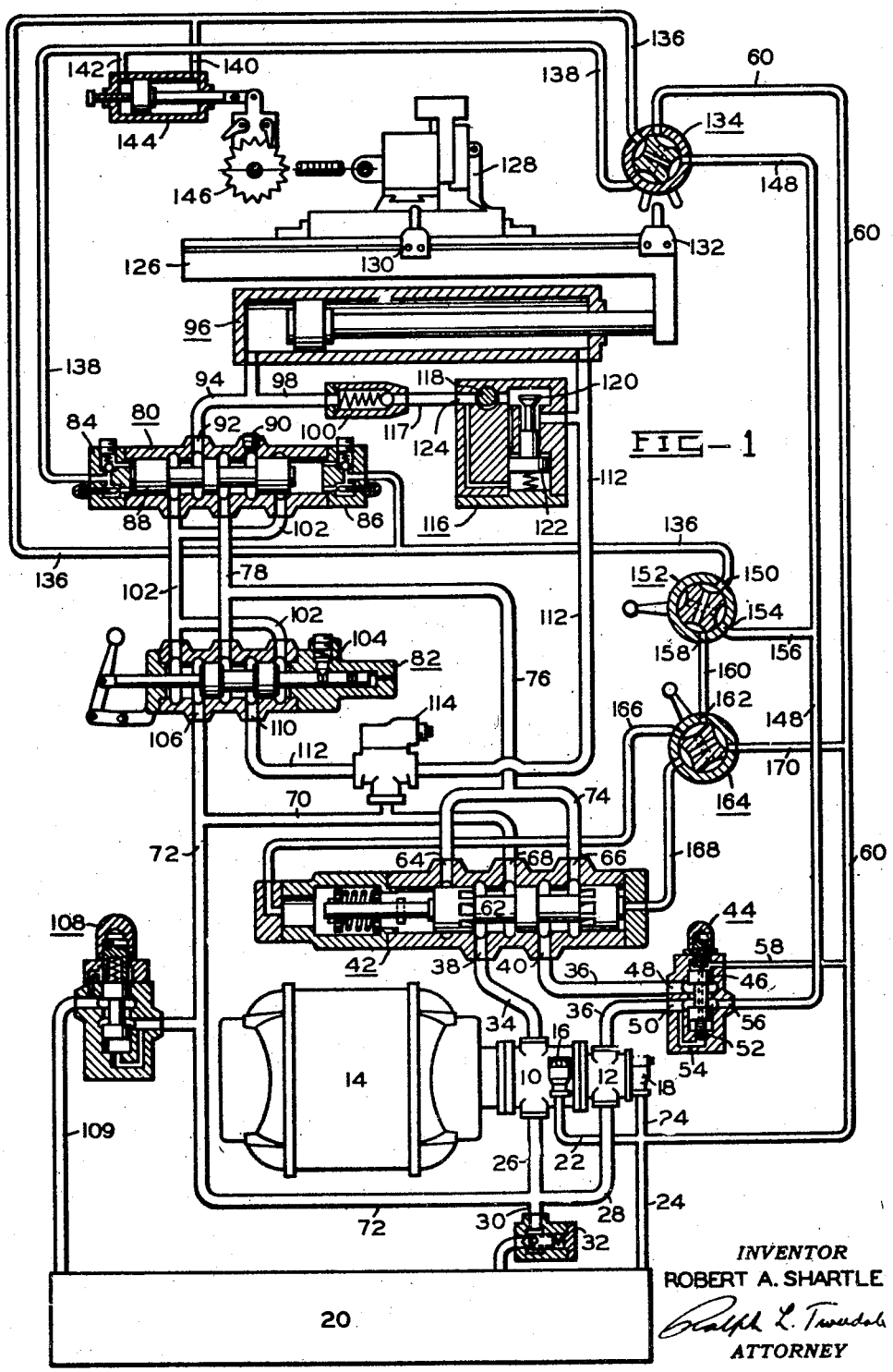

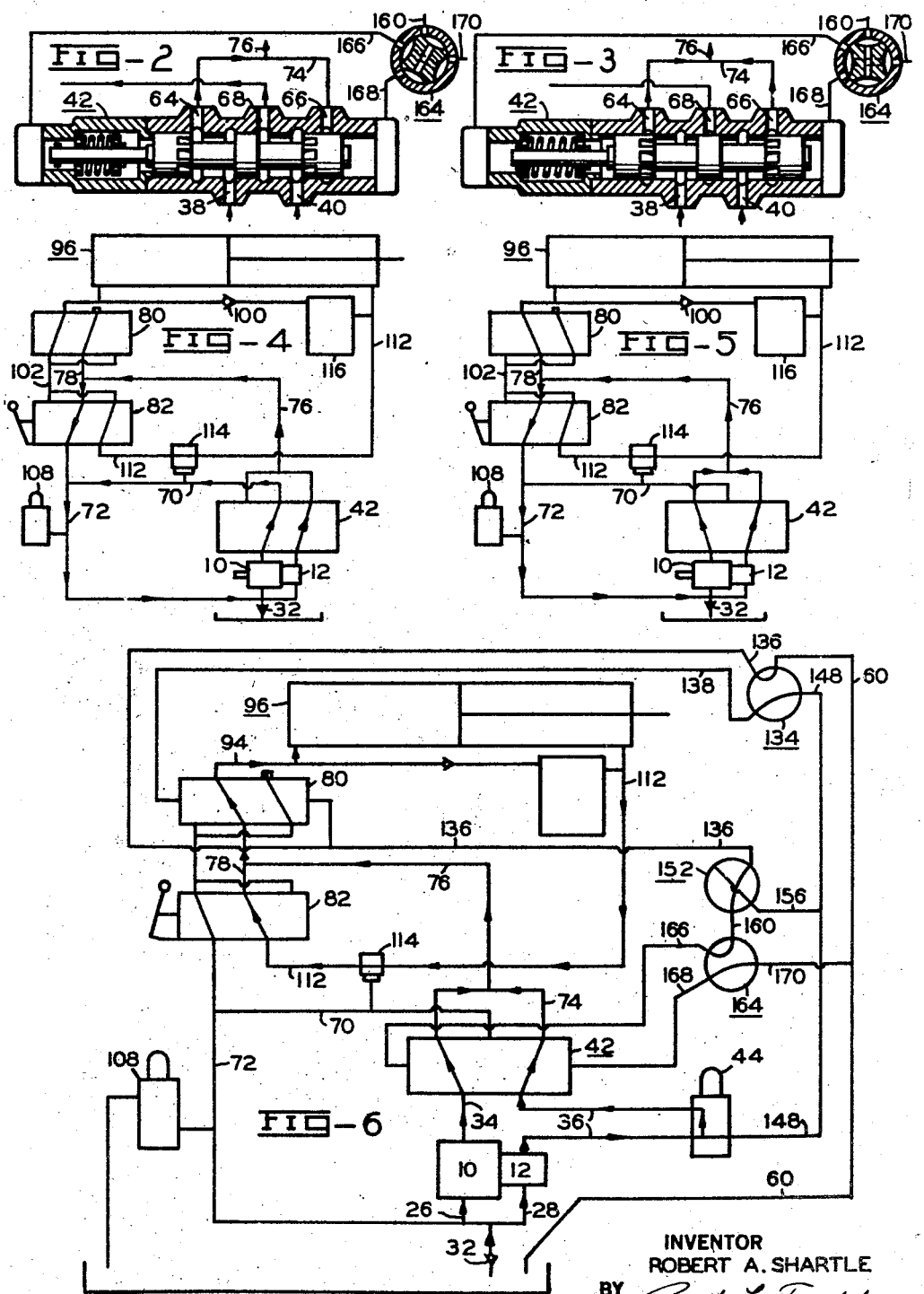

2,419,375

UNITED STATES PATENT OFFICE 2,419,375

POWER TRANSMISSION HAVING A PLURAL PUMP FLUID PRESSURE SOURCE AND A FLOW-REGULATING DIVERTING VALVE

Robert A. Shartle, Rockford, Ill., assignor to Vickers Incorporated, Detroit, Mich., a corporation of Michigan Application June 29, 1942, Serial No. 448,896

5 Claims. (Cl. 60—52)

This invention relates to power transmissions, particularly to those of the type comprising two or more fluid pressure energy translating devices, one of which may function as a pump and another as a fluid motor.

The invention is more particularly concerned with a hydraulic system for operating an alternately reversing slide such as are found on machine tools and which require the maintenance of a controlled but variable feeding rate.

In applications of hydraulic drives to some machine tools, for example, to a planer, the wide range of feed rates which must be covered and the large amount of power involved has heretofore required the use of the expensive variable stroke type of pumping mechanism for commercially successful machines. The difference in cost between a variable stroke pump and a fixed displacement pump of equal rating is very great, and the variable displacement pump has for this reason been excluded from application to machines the sale of which is highly competitive. Accordingly, machines of this class have heretofore been denied the advantages of hydraulic drive because none was available which would compete on a cost basis with previous mechanical drives for the same purpose.

It is an object of the present invention to provide an improved hydraulic power transmission system providing substantially all the advantages of a variable displacement system and which may be produced at a fraction of the cost of such a system.

Further objects and advantages of the present invention will be apparent from the following description, reference being had to the accompanying drawings wherein a preferred form of the present invention is clearly shown.

In the drawings:

Figure 1 is a diagrammatic view of a power transmission system incorporating a preferred form of the present invention.

Figures 2 and 3 illustrate the different operating positions of a control valve of Figure 1.

Figures 4, 5 and 6 are schematic views of the circuit showing the position of valves in various stages of the operating cycle.

In the embodiment of the invention shown in Figure 1, the circuit comprises a pair of pumps 10 and 12 adapted to be driven by a suitable prime mover, such as an electric motor 14. Pumps 10 and 12 are provided with integral relief valves 16 and 18 which limit the pressure therein to a predetermined maximum by discharging the excess pressure to a tank 20 through conduits 22 and 24, respectively. Fluid is withdrawn from the tank 20 by the pumps 10 and 12 through intake conduits 26 and 28, respectively, the latter joining a common conduit 30 which extends to the tank 20, passing through a check valve 32.

Pumps 10 and 12 are provided with delivery conduits 34 and 36 which extend to ports 38 and 40, respectively, of a reverse valve 42, conduit 36 passing through a pressure responsive valve 44. Briefly, the latter comprises a spool 46 spring biased downwardly to cut off port 48 thereof from port 50. Valve 44 is directly operated by pressure in port 50 thereof which acts on plunger 52 through passage 54. The spool 46 is caused to rise, connecting ports 48 and 50 whenever the pressure in port 50 equals the valve spring adjustment. Port 56 of valve 44 is in continuous communication with port 50, irrespective of the position of the spool 46. Valve 44 is externally drained by a conduit 58 which connects with a tank conduit 60.

Valve 42, as shown, is of the spring-centered, pilot-operated type having the end lands of its spool 62 notched so as to connect ports 38 and 40 with ports 64 and 66, respectively, when in its centered position (Figure 3). Port 68 of valve 42 is connected to a conduit 70 which communicates with a conduit 72 and serves as a return conduit for the work circuit. Ports 64 and 66 are joined by a conduit 74 which connects with a conduit 76. The latter communicates with a conduit 78 which connects the pressure ports of a reversing valve 80 and a start-and-stop valve 82, respectively.

Valve 80 is of the four-way, pilot-operated type containing small throttles and check valves in both end caps 84 and 86 to restrict the liquid discharge from the pilot valves and thus slow down the speed of the spool 88. Port 90 of valve 80 is plugged, while port 92 connects to a conduit 94 which leads to the head end of a piston-and-cylinder motor 96. Conduit 94 has a branch conduit 98 extending to a check valve 100 which prevents fluid flow therefrom.

The end or tank ports of valve 80 communicate through conduit 102 with those of valve 82. The latter is of the manually-operated type and contains a spring-pressed detent 104 to maintain it in its two effective operating positions. Port 106 of valve 82 connects to the conduit 72 which extends to the suction side of the pumps 10 and 12 and also communicates with the tank 20 through a pressure responsive valve 108 and a conduit 109. Valve 108 is of similar construction and operation to that of valve 44 hereinbefore described. Valve 108 interrupts the fluid flow to tank until a predetermined pressure is reached, thus maintaining a back pressure in conduit 72.

From port 110 of start-and-stop valve 82, a conduit 112 extends to the rod end of the piston-and-cylinder motor 96, passing through a relief valve 114. The latter is adapted to maintain a predetermined maximum pressure in conduit 112 by discharging any excess pressure into conduit 70. Conduit 112 communicates with a flow control valve 116 which is connected in series by a conduit 117 with the check valve 100.

Flow control valve 116 comprises an adjustable orifice 118 together with a hydrostatic valve 120 under the control of a piston 122 which is subjected to pressure to the left and right of the orifice 118 on its lower and upper face, respectively, so that the valve 120 is caused to open or close the required amount to maintain a constant pressure drop through the orifice 118 irrespective of pressure variations at the port 124.

Piston-and-cylinder motor 96 is of the differential type, preferably with a two-to-one ratio, and is adapted to actuate a slide, such as a planer table 126, carrying stock thereon past a stationary cutter 128. Reciprocating slide 126 carries adjustable cams 130 and 132 to determine its stroke length by actuating a four-way, rotary pilot valve 134. The latter has its cylinder ports connected to conduits 136 and 138 which lead to either pilot pressure chamber of the reversing valve 80. Conduits 136 and 138 have branch conduits 140 and 142, respectively, which extend to the rod and head ends of a cross-feed cylinder 144 which is adapted to move, by means of a feed pawl 146, the cutting tool 128 across the work. The tank port of rotary valve 134 is connected to the conduit 60, while the pressure port thereof is connected to a conduit 148 which leads to the port 56 of the pressure responsive valve 44.

Conduit 136 extends beyond the righthand pilot chamber of valve 80 to a port 150 of a rotary three-way valve 152. Port 154 of the latter is in communication with pressure conduit 148 through conduit 156, while port 158 thereof communicates through conduit 160 with a port 162 of a rotary pilot valve 164. The latter has its two cylinder ports connected to conduits 166 and 168 which extend to either pilot pressure chamber of the valve 42, while its tank port communicates with the tank conduit 60 through a conduit 170.

Rotary valve 152, manually operated between two positions, is arranged to selectively connect either conduit 136 or conduit 156 with conduit 160. Valve 164, manually operated between three positions, is arranged to selectively transpose conduits 166 and 168 with respect to conduit 160 and conduit 170 and also to connect the cylinder ports to the tank port.

In operation, with the parts in the position shown in Figure 1, the circuit is conditioned for repeated cycles of slow feed and rapid return and is in the course of a slow feeding movement. The pilot pressure having traversed conduit 148, valve 134, conduit 136, valve 152, conduit 160, valve 164 and conduit 166 to shift the valves 80 and 42 to the position shown, the delivery of small pump 12 is now directed through sequence valve 44 and valve 42 into conduit 74, thence through conduit 76 to conduit 78. As the latter leads to a plugged port of valve 80, the fluid flow is directed through valve 82, conduit 112 and to the rod end of motor 96. The rate of fluid flow therein is determined by the setting of the flow control valve 116 as the latter "bleeds off" a predetermined volume from the known volume delivered by pump 12. This excess volume passes through conduit 117, check valve 100 and into conduit 98 where it combines with the discharging fluid from the head end of motor 96. This combined flow is now directed through conduit 94, valve 80, conduit 102, valve 82 and into conduit 72. The latter directs some of the discharging fluid to the suction side of the pumps and the remainder to the tank 20 through valve 108. It will be seen that pump 10 at this time is caused to discharge to tank through conduit 34, valve 42, conduits 70 and 72, valve 108 and conduit 109.

At the end of the feed stroke, cam 132 of slide 126 will move rotary valve 134 to connect conduits 148 and 138 and conduits 136 and 60 to thereby shift valve 80 and also to operate the cross-feed cylinder 144. Conduit 136, now open to tank, causes valve 42 to center, the latter expelling fluid through conduit 166, valve 164, conduit 160, valve 152 and into conduit 136 where it flows to tank with the discharging fluid from valve 80.

With the centering of valve 42, the delivery conduits 34 and 36 of pumps 10 and 12, respectively, become connected to conduit 74 as hereinbefore disclosed. The respective pump deliveries now combine to form a total delivery which is directed through conduit 76 into conduit 78. As spool 88 of valve 80 is now to the right, conduit 78 is connected to conduit 94, thus connecting the head and rod ends of the motor 96. The latter is now caused to operate as a differential cylinder with the discharging fluid from the right end traversing conduit 112, valve 82 and into conduit 78, as shown diagrammatically in Figure 6. Upon reaching the end of its stroke, cam 130 on slide 126 will shift valve 134 to the position shown in Figure 1 to again condition the circuit for slow feed, as hereinbefore described.

By this arrangement it will be seen that, in addition to the rapid return where both pumps combine their deliveries, a return directly proportional to the forward feed may be obtained by shifting valve 152. The latter will then connect conduit 156 with conduit 160 and block conduit 136. In this manner constant pilot pressure in conduit 156 is used to maintain the valve 42 in its shifted position without centering regardless of the shifting of valve 134. Thus, if the small pump is used for the feed stroke, it alone will be used for the return stroke.

To obtain a medium feed rate, valve 164 is shifted to connect conduits 160 and 168 and conduits 166 and 170 to shift spool 62 of valve 42 to the extreme left, as shown in Figure 2. This will render inoperative the small pump 12 by causing it to discharge to tank, and connect the large pump 10 with the working circuit. For a high feed rate, valve 164 is shifted to connect conduits 166 and 168 with the tank conduit 170 and blocking conduit 160, as shown in Figure 3. This will cause valve 42 to center to direct the delivery of both pumps into conduit 74. It will be understood that these feed rates may be utilized, with the remainder of the circuit being the same as that described above for the slow feed rate, the only variation being in the position of valve 42. The feed rate may be gradually varied by increasing or decreasing the amount of fluid "bled" off from line 112, and it will be noted that valve 116 need only be large enough to carry the volume delivered by the small pump 12 in order to obtain any feed rate from zero up to full capacity of both pumps.

To stop the slide 126 while in its cutting or feed stroke, valve 82 is shifted to connect conduit 78 with conduit 72 and conduit 112 with conduit 102. This will cause the pump or pumps to circulate fluid at no appreciable pressure by directing the fluid flow to the suction side thereof, as shown in Figure 4. Simultaneously, oil discharging from the head end of motor 96 will be directed through conduit 94, valve 80, conduit 102, valve 82 and conduit 112 to the rod end of motor 96. As twice the amount of oil is being discharged as can be accommodated, the slide 126 will immediately stop, the relief valve 114 absorbing the shock caused by the inertia thereof.

During the return stroke, with valve spool 88 of valve 80 shifted to the right, connecting conduit 78 with conduit 94 and blocking either end of conduit 102, to stop the slide 126, valve 82 is shifted to the left, connecting conduits 78 and 72 and conduits 102 and 112 as best shown in Figure 5. This will cause the pump or pumps to again circulate fluid at no appreciable pressure. Simultaneously, the fluid discharging from the rod end of motor 96 is directed through conduit 112, valve 82 and into conduit 102. As the latter is connected to blocked ports of either valve 80 and 82, the slide 126 is caused to stop, the relief valve again absorbing the shock by discharging any excess pressure into conduit 70.

Thus it will be seen that the present invention provides a means for driving a reciprocating mechanism and stopping the same promptly in either direction, utilizing a relatively simplified circuit incorporating a relief valve which limits the working pressure and also acts as a safety device during the braking operation, relieving excess pressure caused by the inertia of the slide.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination of a fluid motor operable at variable rates of speed, a source of pressure fluid for supplying fluid to said motor and comprising a plurality of fixed displacement pumps, each having a different displacement, a delivery line extending between the source and the motor, a selector valve for selectively rendering various pumps and combinations of pumps effective to deliver fluid to the motor, and means for gradually varying the speed of the motor comprising a pressure-compensated, flow-regulating valve connected to the delivery line for causing a diversion of a variable portion of the fluid delivered from the source, said valve having a range of flow rate adjustment from zero up to and not substantially greater than the delivery of the smallest pump, said pumps differing in size by a multiple of the size of the smallest pump whereby the motor may be operated at any speed up to that of the total capacity of the source.

2. In a hydraulic power transmission system the combination of a fluid motor operable at variable rates of speed, a source of pressure fluid for supplying fluid to said motor and comprising a pair of fixed displacement pumps, each having a different displacement, a delivery line extending between the source and the motor, a selector valve for selectively rendering either or both pumps effective to deliver fluid to the motor, and means for gradually varying the speed of the motor comprising a pressure-compensated, flow-regulating valve connected to the delivery line for causing a diversion of a variable portion of the fluid delivered from the source, said valve having a range of flow rate adjustment from zero up to and not substantially greater than the delivery of the smallest pump, the large pump being twice the size of the small pump whereby the motor may be operated at any speed up to that of the total capacity of the source.

3. In a hydraulic power transmission system the combination of a fluid motor operable at variable rates of speed, a source of pressure fluid for supplying fluid to said motor and comprising a plurality of fixed displacement pumps, each having a different displacement, a delivery line extending between the source and the motor, a selector valve for selectively rendering various pumps and combinations of pumps effective to deliver fluid to the motor, and means for gradually varying the speed of the motor comprising a valve connected to the delivery line for diverting a predetermined proportion of the fluid delivered by the source, said valve having a range of flow rate adjustment from zero up to and not substantially greater than the delivery of the smallest pump, said pumps differing in size by a multiple of the size of the smallest pump whereby the motor may be operated at any speed up to that of the total capacity of the source.

4. In a hydraulic power transmission system for operating an alternately reversing slide movable through feed advance and rapid return strokes, the combination of a differential piston-and-cylinder motor connected to operate the slide through its advance stroke by pressure applied to the smaller area thereof, a source of pressure fluid comprising a plurality of fixed displacement pumps selectively connectable alone or in parallel to supply said motor, means for reversing the flow to the motor to cause a return stroke, and means operable concurrently with said reversing means for connecting said pumps in parallel to supply the maximum delivery during the return stroke.

5. In a hydraulic power transmission system for operating an alternately reversing slide movable through feed advance and rapid return strokes, the combination of a differential piston-and-cylinder motor connected to operate the slide through its advance stroke by pressure applied to the smaller area thereof, a source of pressure fluid comprising a plurality of fixed displacement pumps selectively connectable alone or in parallel to supply said motor, means for reversing the flow to the motor to cause a return stroke, means operable concurrently with said reversing means for connecting said pumps in parallel to supply the maximum delivery during the return stroke, and a selector device for selectively rendering said last-named means effective or ineffective.

ROBERT A. SHARTLE.

REFERENCES CITED

The following references are of record in the file of this patent:

UNITED STATES PATENTS

| Number | Name | Date |
|---|---|---|
| 1,932,760 | West | Oct. 31, 1933 |
| 2,288,830 | Nye | July 7, 1942 |
| 1,848,006 | Ferris | Mar. 1, 1932 |
| 1,982,711 | Vickers | Dec. 4, 1934 |

FOREIGN PATENTS

| Number | Country | Date |
|---|---|---|
| 238,886 | British | Nov. 19, 1926 |